Patented Jan. 1, 1952

2,580,653

UNITED STATES PATENT OFFICE 2,580,653

COMPOSITION FOR KILLING WEEDS

Walter A. Bridgeman, Racine, Wis., assignor to
S. C. Johnson & Son, Inc., Racine, Wis.

No Drawing. Application August 23, 1946,
Serial No. 692,697

6 Claims. (Cl. 71—2.6)

This invention relates to the control and destruction of weeds. More particularly, it relates to a wax containing herbicide and an improved method of killing weeds by the use of an aqueous wax emulsion containing a herbicide.

The outstanding sensation concerning weed killers was the recent public announcement of growth-regulating substances or plant hormones as herbicides. These plant hormones operate on the principle of growth regulation rather than caustic action or poisoning. The hormone penetrates inside the plant and without the typical leaf-burning destroys the growing regions in the course of a few weeks. Thus in practice, the hormones are sprayed on the surface of the weeds rather than on the soil. Since it acts slowly, care must be taken that the aqueous solution of the herbicide is not applied within a few hours of a rain. Tests have shown that when aqueous solutions of the herbicide were applied within 24 hours of a heavy rainfall, the effectiveness of the herbicide was reduced to a marked degree.

Probably the best known substances which have been successfully used as herbicides are the halogenated phenoxy monocarboxylic aliphatic acids, their salts and esters, such as 2,4-dichlorophenoxyacetic acid, known commercially as 2,4-D, and 2,4,5-trichlorophenoxyacetic acid, known commercially as 2,4,5-T, as well as the ethyl and butyl esters of 2,4-dichlorophenoxyacetic acid.

2,4-dichlorophenoxyacetic acid is only slightly soluble in water and attempts to dissolve in inexpensive mineral oils, such as kerosene and fuel oil, have been unsuccessful. Investigators report that over 50 of the more common organic solvents were tested, in an effort to find a suitable co-solvent of 2,4-dichlorophenoxyacetic acid for use in mineral oils, and of these only tributyl phosphate proved satisfactory.

Now, in accordance with my invention, I have developed an improved process of killing weeds in the active state of growth comprising applying to the weeds an aqueous wax emulsion containing a material selected from the group consisting of halogenated phenoxy monocarboxylic aliphatic acids, their salts and esters. For use in this process I have developed a new and novel composition comprising an aqueous wax emulsion containing a material selected from the group consisting of halogenated phenoxy monocarboxylic aliphatic acids, their salts and esters.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

An aqueous wax emulsion was prepared by melting 5.4 parts lanolin, 6.75 parts microcrystalline paraffin, and 4.75 parts carnauba in a suitable vessel by heating to about 200° F. There was then added .5 part 2,4-dichlorophenoxyacetic acid with stirring, followed by the addition of 6.75 parts petroleum sulfonate. The temperature was maintained at 200° F. for a few minutes and 120 parts water was slowly added at a rate so as to maintain a transparent gel during the time the gel continued to absorb the water and until the gel breaks. A 10% solution of aerosol O. T. (dioctyl sodium sulfosuccinate) was prepared by adding 13.5 parts of aerosol O. T. to 135 parts of water. This solution was then added to the emulsion and stirred. Then 2.5 parts of the sodium salt of 2,4-dichlorophenoxyacetic acid was dissolved in 39 parts of water and added to the emulsion with stirring. This emulsion was a stable emulsion having a pH of about 6.3.

Example 2

An aqueous wax emulsion was prepared by melting 5.4 parts lanolin, 6.75 parts microcrystalline paraffin and 4.75 parts carnauba in a suitable vessel by heating to about 200° F. There was then added 3 parts 2,4-dichlorophenoxyacetic acid with stirring, followed by the addition of 6.75 parts petroleum sulfonate. The temperature was maintained at 200° F. for a few minutes and 120 parts of water was slowly added at a rate so as to maintain a transparent gel during the time the gel continued to absorb the water and until the gel breaks. A 10% solution of aerosol O. T. (dioctyl sodium sulfosuccinate) was prepared by adding 13.5 parts of aerosol O. T. to 135 parts of water. This solution was then added to the emulsion and stirred. The emulsion was then diluted with 39 parts of water. This emulsion was a stable emulsion having a slightly acid pH.

Example 3

Example 1 may be repeated except 2,4-dichlorophenoxyacetic acid may be omitted and the sodium salt of 2,4-dichlorophenoxyacetic acid increased to 3 parts. The resulting emulsion will be substantially identical with that of Example 1.

Example 4

Example 2 may be repeated using 2,4,5-trichlorophenoxyacetic acid instead of 2,4-dichlorophenoxyacetic acid. The resulting emulsion will be stable, with a slightly acid pH and will be effective as a herbicide when diluted with 5 parts of water to 1 part of emulsion.

Example 5

Example 2 may be repeated using the butyl ester of 2,4-dichlorophenoxyacetic acid as the active ingredient rather than 2,4-dichlorophenoxyacetic acid. The emulsion when diluted with 5 parts of water to 1 part of emulsion will be an effective herbicide.

Example 6

Example 2 may be repeated using that ethyl ester of 2,4-dichlorophenoxyacetic acid as the active ingredient rather than 2,4-dichlorophenoxyacetic acid. The emulsion will be the equivalent of the emulsion of Example 5 as a herbicide.

Example 7

The emulsion of Example 1 was diluted with 5 parts of water to 1 part of emulsion (1500 parts of active ingredient per million parts of emulsion) which raised the pH to 6.8, and a plot of grass was sprayed. After three weeks this plot was compared with a plot of grass treated with a water solution of sodium salt of 2,4-dichlorophenoxyacetic acid of the same concentration. The kill in the plot treated with the aqueous wax emulsion containing the active ingredient was about 25% more effective.

It is therefore apparent from the above examples that a variety of stable wax emulsions may be prepared containing a concentration of an active herbicide. The amount of active herbicidal agent will vary, but when applied, the lower effective limits of active agent appear to be about .04%. This amount may be increased, depending upon the particular species of plant to be eradicated, but generally will not exceed .15%. In commercial practice, it is suggested that a concentrate be prepared, such as that of Example 1, that when diluted with 5 parts of water per part of emulsion, the resulting emulsion will have a concentration of 1500 parts of active agent per million parts of emulsion. If a lesser concentration is desired, it can easily be obtained by dilution of the emulsion with additional water. If the emulsion is to be applied to grass as a selective herbicide the concentration should be diluted sufficiently to prevent browning or burning of the grass.

The active agents of the invention are the halogenated phenoxy monocarboxylic aliphatic acids, their esters and salts.

The term "aliphatic acids" is broad enough to include both the saturated and unsaturated acids. For practical reasons, acids having two to nine carbon atoms are preferred, but the invention is not restricted thereto. As examples of suitable acids may be mentioned acetic, propionic, butyric, valeric, hexoic, acrylic, methyl acrylic, etc.

The term "esters" is broad enough to cover the esters corresponding to both the saturated and unsaturated alcohols. As examples of suitable esters may be mentioned alkyl and alkylene esters, such as methyl, ethyl, propyl, butyl, amyl, octyl, lauryl, oleyl, allyl, and isoprene esters, the esters of polyhydroxy alcohols, such as the esters of ethylene glycol and of the polyethylene glycols, and the aralkyl esters, such as the benzyl esters.

The polyethylene glycol esters may be made by heating a polyethylene glycol, such as Carbowax of molecular weight of 600 or over with a halogenated phenoxy acid in the presence of a catalyst, such as sulphuric acid. The Carbowaxes are products of Carbide and Chemicals Corp., New York, New York.

The term "salts" is broad enough to include the alkali and alkaline earth salts such as sodium, potassium, lithium, ammonium, magnesium, calcium, the acid salts, such as the sodium and potassium acid salts, the salts of other metals, such as copper and iron, and the substituted organic ammonium salts, such as the salts of methylamine, trimethylamine, diethylamine, monoethanolamine, triethanolamine and isopropanolamine.

The following is a representative list of compounds, which are particularly suitable for practicing the invention.

The halogen substitution products of phenoxyacetic acid such as 2-chlorophenoxyacetic acid, 4-chlorophenoxyacetic acid, 2,4 - dichlorophenoxyacetic acid, 2,4,5 - trichlorophenoxyacetic acid, 2,4,6-trichlorophenoxyacetic acid, 2,3,4,6-tetrachlorophenoxyacetic acid, pentachlorophenoxyacetic acid, 4-bromophenoxyacetic acid, 2,4-dibromophenoxyacetic acid, 2,4,6-tribromophenoxyacetic acid, 4-iodophenoxyacetic acid, 4-fluorophenoxyacetic acid and 2,4-difluorophenoxyacetic acid and their esters and salts.

The foregoing list is given by way of illustration only, and the corresponding derivatives of the higher homologues of phenoxyacetic acid, e. g. butyric, valeric and hexoic acids, or of the corresponding unsaturated acids, e. g. acrylic acid and its homologues may be used.

The active agent may be added to the emulsion at various stages of preparation. For example, if a halogenated phenoxymonocarboxylic aliphatic acid is used it may be added to the molten waxes, or it may be added after the emulsion has been formed. Likewise, if a water-soluble salt is used, it may be used either alone or in conjunction with the acid, and may be added either to the molten waxes, during the preparation of the emulsion, or after the emulsion has been formed. If desired, the water-soluble active agent may be added to the wax emulsion just before being applied to the plant.

While petroleum sulfonate was used as the emulsifying agent in the examples, this is not intended as a limitation, as other wax emulsifying agents such as oleic acid and morpholine, triethanolamine, sodium salts of fatty acids, and the like may be used.

Although only carnauba wax and paraffin wax have been used in the examples, other water-insoluble waxes, resins and mixtures thereof may be used either in toto or in part.

While the temperature of 200° F. was used in the examples in the preparation of the emulsions, this temperature may be varied over a wide range as taught by the art.

It will be noted in the examples that the pH of the wax emulsion when applied to the grass plots in Example 7 was 6.8. While the pH may be varied over a wide range, it should remain on the acid side. It is suggested a pH of less than 3.5 should not be used as it may affect the stability of the emulsion. Thus, it is recommended a pH of from about 3.5 to 7 be used.

The use of an aqueous wax emulsion as the vehicle for applying these active agents has increased the effectiveness of the compounds as herbicidal agents. Furthermore, the compositions of this invention are easily applied, for example, by spraying, and chances of the herbicide being washed off of the treated plants by rains, and the like are greatly reduced as the wax film after application becomes a water-repellent herbicide-containing film.

Other modes of applying the principle of the invention may be employed instead of those explained, change being made as regards the method herein disclosed, provided the step or steps stated by any of the following claims or the equivalent of such stated step or steps be employed.

I claim:

1. An aqueous wax emulsion, having a pH of from about 3.5 to 7, containing a material selected from the group consisting of halogenated phenoxy monocarboxlyic aliphatic acids, their salts and esters in a concentration of at least .04% by weight, said emulsion being characterized upon application by drying to a wax film which repels moisture yet allows diffusion of said active material contained therein into the surface upon which said emulsion is applied.

2. An aqueous wax emulsion, having a pH of from about 3.5 to 7, containing chlorophenoxyacetic acid in a concentration of at least .04% by weight, said emulsion being characterized upon application by drying to a wax film which repels moisture yet allows diffusion of said chlorophenoxyacetic acid contained therein into the surface upon which said emulsion is applied.

3. An aqueous wax emulsion, having a pH of from about 3.5 to 7, containing dichlorophenoxyacetic acid in a concentration of at least .04% by weight, said emulsion being characterized upon application by drying to a wax film which repels moisture yet allows diffusion of said dichlorophenoxyacetic acid contained therein into the surface upon which said emulsion is applied.

4. An aqueous wax emulsion, having a pH of from about 3.5 to 7, containing the sodium salt of dichlorophenoxyacetic acid in a concentration of at least .04% by weight, said emulsion being characterized upon application by drying to a wax film which repels moisture yet allows diffusion of said sodium salt of dichlorophenoxyacetic acid contained therein into the surface upon which said emulsion is applied.

5. An aqueous wax emulsion, having a pH of from about 3.5 to 7, containing 2,4-dichlorophenoxyacetic acid in a concentration of at least .04% by weight, said emulsion being characterized upon application by drying to a wax film which repels moisture yet allows diffusion of said 2,4-dichlorophenoxyacetic acid contained therein into the surface upon which said emulsion is applied.

6. An aqueous wax emulsion, having a pH of from about 3.5 to 7, containing the sodium salt of 2,4-dichlorophenoxyacetic acid in a concentration at least .04% by weight, said emulsion being characterized upon application by drying to a wax film which repels moisture yet allows diffusion of said sodium salt of 2,4-dichlorophenoxyacetic acid contained therein into the surface upon which said emulsion is applied.

WALTER A. BRIDGEMAN.

REFERENCES CITED

The following references are of record in the file of this patent:

UNITED STATES PATENTS

| Number | Name | Date |
|---|---|---|
| 1,632,027 | Heitmann | June 14, 1927 |
| 1,826,900 | Schrader | Oct. 13, 1931 |
| 1,976,780 | Grant | Oct. 16, 1934 |
| 2,284,970 | Avery | June 2, 1942 |
| 2,390,941 | Jones | Dec. 11, 1945 |

OTHER REFERENCES

J. Economic Entomology, June 1936, pages 580 and 581.